(12) United States Patent
Hasegawa

(10) Patent No.: US 7,848,640 B2
(45) Date of Patent: Dec. 7, 2010

(54) ENCLOSURE FOR ELECTRIC EQUIPMENT AND IMAGING DEVICE

(75) Inventor: Takeshi Hasegawa, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 148 days.

(21) Appl. No.: 12/237,714

(22) Filed: Sep. 25, 2008

(65) Prior Publication Data

US 2009/0086417 A1 Apr. 2, 2009

(30) Foreign Application Priority Data

Sep. 28, 2007 (JP) .............................. 2007-256709

(51) Int. Cl.
*G03B 17/02* (2006.01)
(52) U.S. Cl. ...................... 396/535; 396/541
(58) Field of Classification Search ................. 396/535, 396/541
See application file for complete search history.

(56) References Cited

U.S. PATENT DOCUMENTS

| | | | | |
|---|---|---|---|---|
| 6,025,991 | A * | 2/2000 | Saito | 361/704 |
| 6,657,869 | B1 * | 12/2003 | Linke et al. | 361/752 |
| 7,324,353 | B2 * | 1/2008 | Satoh et al. | 361/816 |
| 2003/0184961 | A1 * | 10/2003 | Ahn | 361/683 |
| 2006/0187645 | A1 * | 8/2006 | Numata | 361/704 |

FOREIGN PATENT DOCUMENTS

| | | |
|---|---|---|
| JP | 05-243751 A | 9/1993 |
| JP | 09-027682 A | 1/1997 |
| JP | 2005-045025 A | 2/2005 |

* cited by examiner

*Primary Examiner*—Rodney E Fuller
(74) *Attorney, Agent, or Firm*—Sughrue Mion, PLLC

(57) ABSTRACT

According to an enclosure for electric equipment of an aspect of the present invention, the enclosure having the plurality of accommodation portions accommodating separate contents, respectively, can be formed by one molding without assembling a plurality of components, which can reduce the number of assembling processes. Also, formation by one component eliminates a gap which would be generated by assembling components, which can improve enclosure strength and designability and reduce manufacturing costs.

16 Claims, 6 Drawing Sheets

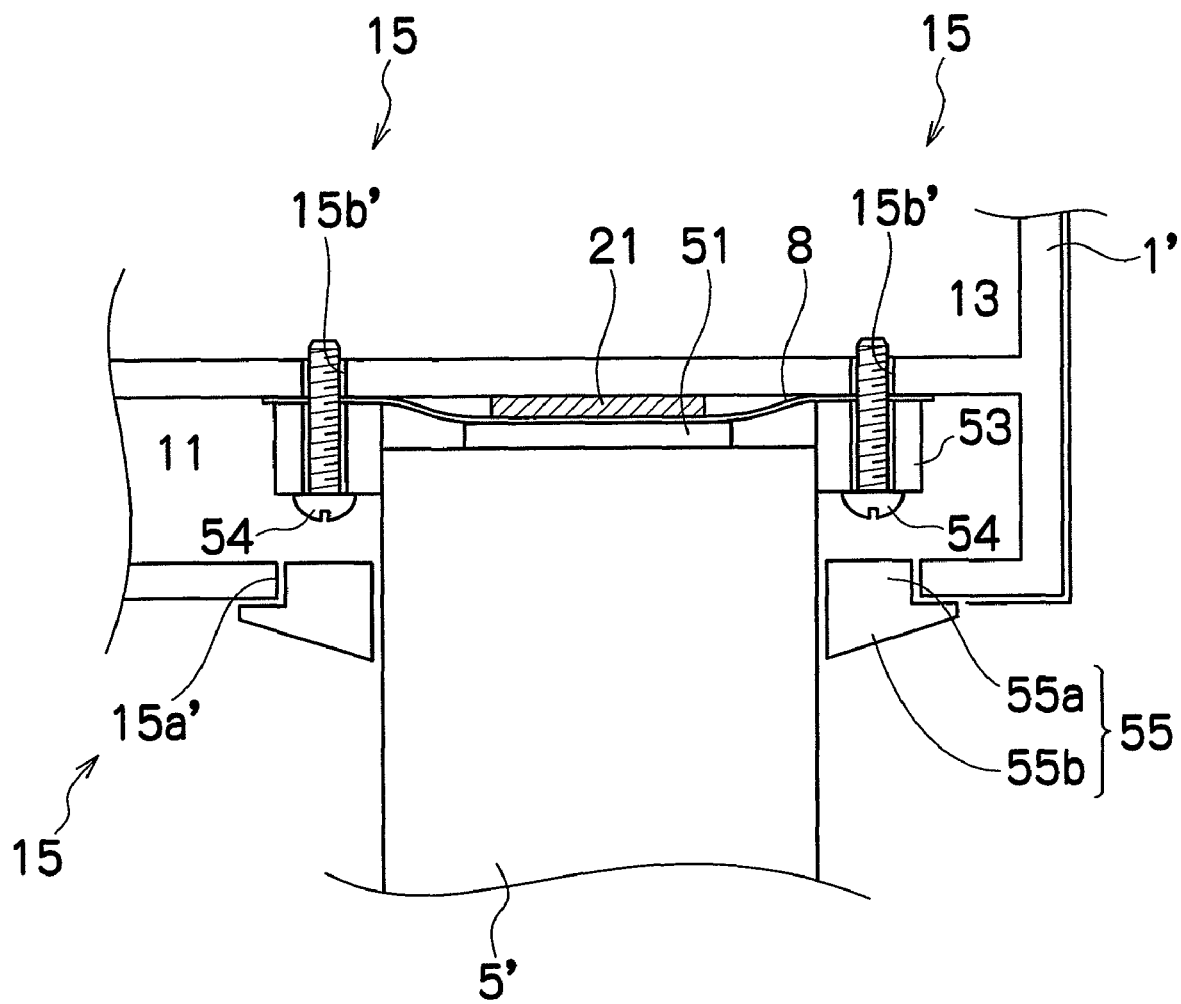

ENCLOSURE FOR ELECTRIC EQUIPMENT AND IMAGING DEVICE

BACKGROUND OF THE INVENTION

1. Field of the Invention

The present invention relates to an enclosure for electronic equipment and an imaging device and particularly to an enclosure for electronic equipment and an imaging device formed by extrusion molding.

2. Description of the Related Art

As an enclosure using a member made by extrusion molding, the following arts are disclosed.

Japanese Patent Application Laid-Open No. 2005-45025 proposes an enclosure formed in a box shape by an extrusion molding member and a press molding member.

Japanese Patent Application Laid-Open No. 5-243751 proposes an enclosure in which an end plate is mounted at both ends of a member formed in a cylindrical shape through a packing.

Japanese Patent Application Laid-Open No. 9-27682 proposes an enclosure in which a plurality of members incorporating components are inserted and fitted inside a cylindrical member formed by extrusion molding.

SUMMARY OF THE INVENTION

The enclosure of Japanese Patent Application Laid-Open No. 2005-45025 is formed by extrusion molding, but since a box-shaped enclosure is made by combining plate-state members, there is a problem that assembling performance is poor. Also, a joint between the members is seen from outside, which has a problem of lack in designability.

The enclosure of Japanese Patent Application Laid-Open No. 5-243751 has a structure in which only one rectangular cavity is formed inside the cylindrical member, and in order to incorporate a component inside, a member incorporating the component should be further assembled, which has a problem of poor assembling performance.

The enclosure of Japanese Patent Application Laid-Open No. 9-27682 incorporates a plurality of members incorporating components inside the cylindrical member extrusion-molded, which also has a problem of poor assembling performance similarly to the enclosure described in Japanese Patent Application Laid-Open No. 5-243751.

The present invention has been made in view of the above circumstances and has an object to provide an enclosure for electronic equipment by extrusion molding which is excellent in assembling performance and heat transfer property and can ensure required strength without increasing the number of parts.

In order to achieve the above object, a first aspect of the present invention provides an enclosure for electronic equipment, comprising: an enclosure body which is made of a metal and formed in a cylindrical shape; and a partition wall which partitions inside of the enclosure body, wherein the enclosure body and the partition wall are formed by extrusion molding, and two or more accommodation portions accommodating contents of electronic equipment are formed inside the enclosure body by the partition wall.

According to the enclosure for electronic equipment according to the first aspect, the cylindrical metal enclosure for electronic equipment in which two or more accommodation portions for accommodating the contents of the electronic equipment are formed by the partition wall dividing the inside of the cylindrical enclosure body is formed by extrusion molding. As a result, the enclosure having a plurality of accommodation portions accommodating separate contents, respectively, can be formed by one molding without assembling a plurality of components, which can reduce the number of assembling processes. Also, formation by one component eliminates a gap which would be generated by assembling components, which can improve enclosure strength and designability and reduce manufacturing costs.

The enclosure for electronic equipment according to a second aspect is characterized in that in the enclosure for electronic equipment according to the first aspect, a space as an insulating layer is formed by the partition wall between the two accommodation portions partitioned by the partition wall.

According to the enclosure for electronic equipment according to the second aspect, a space as an insulating layer formed by the partition wall is formed between the two accommodation portions partitioned by the partition wall. As a result, such structure can be realized that heat generated by electronic components such as an image pickup element, IC and the like hardly affect components accommodated in other accommodation portions. Also, since the heat generated in the electronic components such as the image pickup element, IC and the like is not directly transferred to other electronic components, occurrence of nonconformity in the electronic components such as the image pickup element, IC and the like caused by the heat generated in the other electronic components can be prevented.

The enclosure for electronic equipment according to a third aspect is characterized in that an insulating sheet is inserted into the space in the enclosure for electronic equipment according to the second aspect.

According to the enclosure for electronic equipment according to the third aspect, the insulating sheet is inserted into the space as the insulating layer formed by the partition wall. As a result, insulating effect is further improved, and influence by heat can be further reduced.

The enclosure for electronic equipment according to a fourth aspect is characterized in that in the enclosure for electronic equipment according to any one of the first to third aspects, after extrusion molding of the enclosure, an insertion hole of an image pickup lens unit is formed on an exterior portion of the enclosure and a mounting hole of the image pickup lens unit is formed on at least one of the exterior portion and the partition wall of the enclosure by secondary mechanical machining.

According to the enclosure for electronic equipment according to the fourth aspect, after the extrusion molding of the enclosure, the insertion hole of the image pickup lens unit is formed by secondary mechanical machining on the exterior portion of the enclosure, and the mounting hole of the image pickup lens unit is formed by the secondary mechanical machining on at least one of the exterior portion and the partition wall of the enclosure. As a result, a lens unit can be mounted onto the enclosure. Also, by forming the mounting hole on the exterior portion and the partition wall, mounting accuracy of the lens unit to the enclosure can be improved, and strength against drop impact of a mounting portion can be enhanced.

An imaging device according to a fifth aspect comprises: an enclosure for electronic equipment according to the fourth aspect; and an image pickup lens unit including an image pickup element, and the imaging device is characterized in that the image pickup element is brought into contact with the partition wall directly or through a heat transfer member when the lens unit is positioned and fixed on the enclosure.

According to the imaging device according to the fifth aspect, the lens unit is mounted so that that image pickup element is brought into contact with the partition wall directly or through the heat transfer member when the lens unit is positioned and fixed. As a result, heat generated at the image pickup element can be efficiently radiated.

The imaging device according to a sixth aspect comprises: an enclosure for electronic equipment according to any one of the first to fourth aspects, and the imaging device is characterized in that an image pickup lens unit is disposed at one of the two accommodation portions partitioned by the partition wall of the enclosure, while a board is disposed at the other accommodation portion.

The imaging device according to a seventh aspect is characterized in that in the imaging device according to the sixth aspect, the board is guided by right and left or upper and lower grooves formed inside the other accommodation portion and accommodated in the other accommodation portion and fixed by a fixing device provided at the enclosure.

According to the imaging device according to the seventh aspect, the board is guided in the groove in the horizontal or vertical direction and accommodated, by which the board is positioned in the accommodation portion and fixed to the enclosure. As a result, the number of components required for mounting of the board can be reduced.

The imaging device according to an eighth aspect is characterized in that in the imaging device according to the sixth or seventh aspect, electronic component is mounted on the board, and the electronic component is brought into contact with at least one of the exterior portion and the partition wall directly or through a heat transfer member at fixation by the fixing device.

According to the imaging device according to the eighth aspect, the board is fixed to the enclosure by the fixing device so that the electronic component mounted on the board is brought into contact with at least one of the exterior portion and the partition wall directly or through the heat transfer member. As a result, heat generated at the electronic component can be efficiently radiated.

The imaging device according to a ninth aspect is characterized in that in the imaging device according to any one of the sixth to eighth aspects, the board has a pattern for reference potential formed thereon and the pattern for reference potential is brought into contact with at least one of the exterior portion and the partition wall at fixation by the fixing device.

According to the imaging device according to the ninth aspect, the board is fixed to the enclosure by the fixing device so that the pattern for reference potential formed on the board is brought into contact with at least one of the exterior portion and the partition wall. As a result, the enclosure can be used as a ground, which can improve strength against static electricity.

The imaging device according to a tenth aspect is characterized in that in the imaging device according to any one of the fifth to ninth aspects, an accommodation portion substantially in the shape of L in which a battery provided with an inverse-insertion prevention shape is accommodated is further provided.

According to the imaging device according to the tenth aspect, the accommodation portion substantially in the L-shape used as a battery accommodation portion is formed. As a result, without increasing the number of processes in a machining process and the assembling process or without increasing the number of components, the battery accommodation portion having an effect to prevent inverse insertion can be formed. Also, the inverse insertion of a battery can be prevented by the substantial L-shape.

According to the present invention, an enclosure for electronic equipment which is excellent in assembling performance and heat transfer property and can ensure required strength can be provided by extrusion molding without increasing the number of components.

BRIEF DESCRIPTION OF THE DRAWINGS

FIG. 5 is a sectional view of an essential part of a digital camera enclosure 1' of a second embodiment to which the present invention is applied;

DETAILED DESCRIPTION OF THE PREFERRED EMBODIMENTS

First Embodiment

Figure 1A:
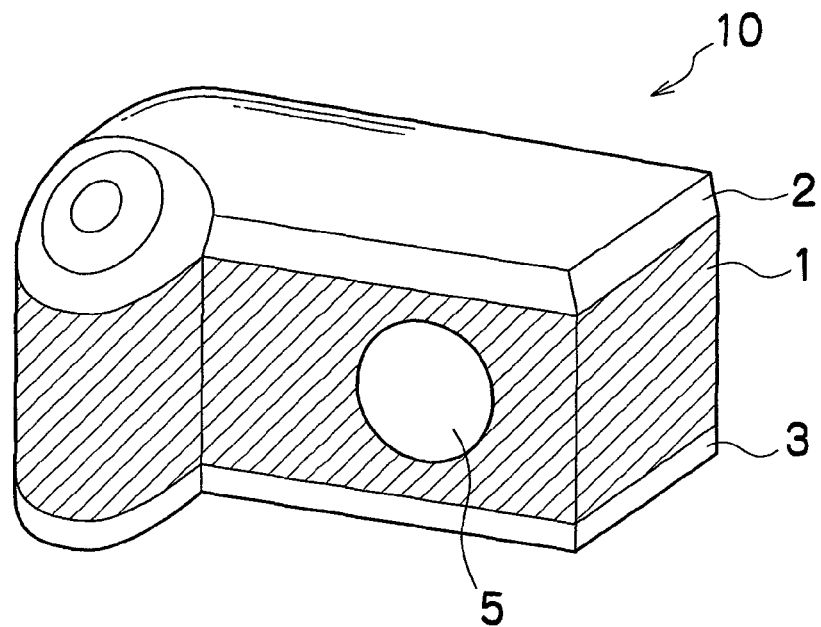
FIG. 1A is a perspective view of a digital camera 10 using a digital camera enclosure 1 of a first embodiment to which the present invention is applied.
Figure 1B:
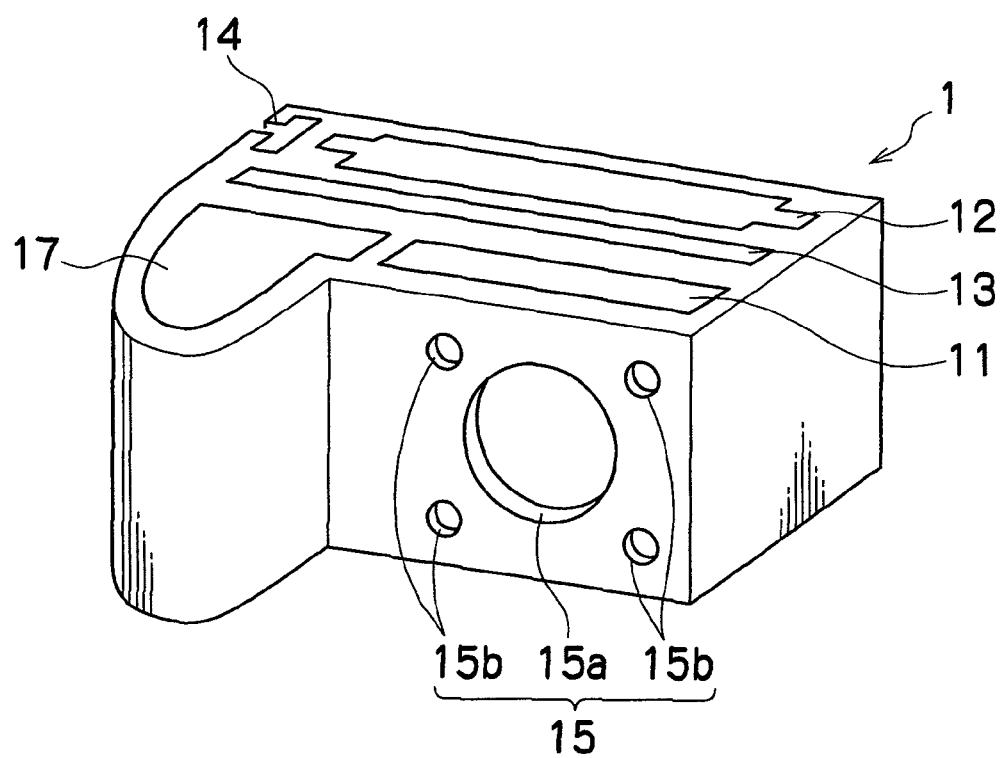
FIG. 1B is a perspective view of a digital camera enclosure 1.
Figure 2:
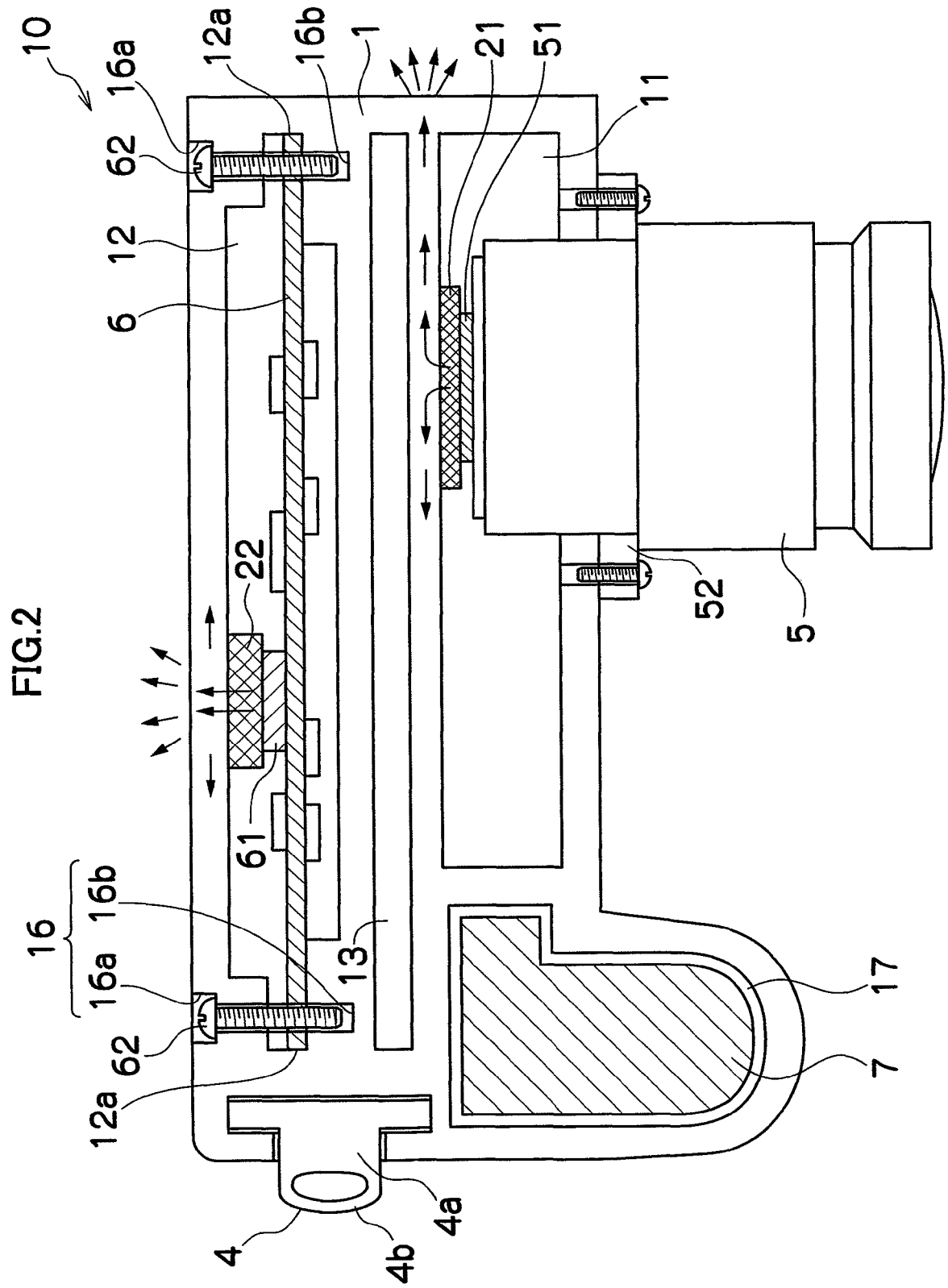
FIG. 2 is a sectional view of an essential part of the digital camera 10 using the digital camera enclosure 1.

FIG. 1A is a perspective view of a digital camera 10 using a digital camera enclosure 1 according to a first embodiment of the present invention, and FIG. 1B is a perspective view of the digital camera enclosure 1. FIG. 2 is a perspective view of an essential part of the digital camera 10 using the digital camera enclosure 1.

The digital camera 10 mainly comprises the digital camera enclosure 1, an upper plate 2, a lower plate 3, a strap mounting member 4, and a lens barrel 5.

The digital camera enclosure 1 is formed of aluminum alloy and molded by extrusion molding by extrusion in the vertical direction of the enclosure (vertical extrusion). As the aluminum alloy used in the digital camera enclosure 1, Al—Mg—Si A6063, Al—Mn A3003, A3004 and the like excellent in extrusion performance, corrosion resistance and surface treatment performance can be used, considering strength, moldability, cost and the like. Various metal materials including magnesium alloy, stainless and the like may be used as the material of the digital camera enclosure 1.

The strap mounting member 4 is constituted by a substantially T-shaped portion 4a with the same length as the digital camera enclosure 1 and a hole portion 4b through which a strap shorter than the substantially T-shaped portion 4a is passed.

In a lens barrel 5, a lens group is mainly disposed inside and an image pickup element 51 is disposed on a rear face. On the rear face of the image pickup element 51, a flexible board, not shown, is disposed and connected to a board 6 through a section of an upper face or a lower face of the digital camera enclosure 1. As a result, image data obtained by the image pickup element 51 is transmitted to a CPU mounted on the board 6.

On the board 6, electronic components such as IC are mounted, and on a region at least in contact with an electronic component accommodation portion 12 on the front face side of the board 6, an exposed ground pattern (pattern for reference potential) is formed. The ground pattern is formed so that its area becomes as large as possible. Also, on the board 6, a hole through which a screw mounting the board 6 onto the digital camera enclosure 1 penetrates is formed.

After components such as the strap mounting member 4, the lens barrel 5, the board 6 and the like are mounted at a through hole (details will be described later) formed by extrusion molding inside the digital camera enclosure 1, the upper plate 2 and the lower plate 3 are mounted onto the digital camera enclosure 1 so as to assemble the digital camera 10.

[Structure of Digital Camera Enclosure 1]

The digital camera enclosure 1 is a substantially rectangular cylindrical member having a projecting shape to be gripped by a user provided at a part on the front face side. Inside the digital camera enclosure 1, an optical system accommodation portion 11, an electronic component accommodation portion 12, an insulating layer 13, and a battery accommodation portion 17, which are through holes formed by vertical extrusion, are formed. Also, on an outer edge of the digital camera enclosure 1, a recess portion 14 for strap mounting member in an undercut shape formed by extrusion molding, a lens barrel mounting portion 15, a board mounting portion 16 and the like are formed.

The optical system accommodation portion 11 is a substantially rectangular through hole provided on the front face side of the digital camera enclosure 1 and formed at the same time when the outer shape of the digital camera enclosure 1 is formed by extrusion molding. Inside the optical system accommodation portion 11, a lens barrel 5 is mounted through the lens barrel mounting portion 15 provided on the front face side of the optical system accommodation portion 11.

The electronic component accommodation portion 12 is a substantially rectangular through hole provided on a rear face side of the digital camera enclosure 1 and having a projection portions in the right and left directions and is formed at the same time when the outer shape of the digital camera enclosure 1 is formed by extrusion molding. Inside the electronic component accommodation portion 12, through the board mounting portion 16 provided on the rear face side of the electronic component accommodation portion 12, the board 6 on which the electronic component such IC is mounted is accommodated. Projection portions 12a provided right and left of the electronic component accommodation portion 12 are used as positioning portions of the board 6 in the horizontal direction.

The insulating layer 13 is a center part of the digital camera enclosure 1 and is a substantially rectangular through hole formed between the optical system accommodation portion 11 and the electronic component accommodation portion 12 and formed at the same time when the outer shape of the digital camera enclosure 1 is formed by extrusion molding. The insulating layer 13 is formed so that there is no spot where the optical system accommodation portion 11 is adjacent to the electronic component accommodation portion 12. As a result, heat generated at the optical system accommodation portion 11 or the electronic component accommodation portion 12 is shielded by the insulating layer 13 and not directly transferred to the other accommodation portions.

The recess portion 14 for strap mounting member is a recess portion substantially in the T-shape formed on an outer edge of the digital camera enclosure 1 and is formed at the same time when the outer shape of the digital camera enclosure 1 is formed by extrusion molding.

The lens barrel mounting portion 15 is formed by post machining on a wall on the front face side of the optical system accommodation portion 11 of the digital camera enclosure 1 and constituted by a hole 15a having a diameter larger than the maximum diameter of the lens barrel 5 and four screw holes 15b formed around the hole 15a and used when the lens barrel 5 is fixed to the digital camera enclosure 1. It is only necessary that the number of the screw holes 15b may be three or more and not limited to four.

The board mounting portion 16 is formed by post machining and is constituted by four holes 16a formed on a wall of the rear face side of the electronic component accommodation portion 12 and four screw holes 16b formed integrally with the holes 16a and formed on a wall on the front face side of the electronic component accommodation portion 12 (wall between the electronic component accommodation portion 12 and the insulating layer 13). The number of the holes 16a and the screw holes 16b is not limited to 4 as with the screw holes 15b.

The battery accommodation portion 17 is substantially L-shaped through hole provided inside the projection portion on the front face of the digital camera enclosure 1 and is formed at the same time when the outer shape of the digital camera enclosure 1 is formed by extrusion molding. A substantially L-shaped battery 7 substantially the same as the battery accommodation portion 17 can be inserted inside in a predetermined direction but can not be inserted in an opposite direction, by which inverse insertion of a battery is prevented.

[Manufacturing Method of the Digital Camera Enclosure 1]

First, by extruding aluminum alloy from a die (not shown) using an extruding machine (not shown), a hollow cylindrical rod material having a sectional shape shown in FIG. 1B is molded. By cutting the substantially rectangular hollow cylindrical rod material obtained as such to a predetermined length by a disc saw and the like, the digital camera enclosure 1 provided with the optical system accommodation portion 11, the electronic component accommodation portion 12, the insulating layer 13, the recess portion 14 for strap mounting member, and the battery accommodation portion 17 is formed.

Next, by mechanical machining, the lens barrel mounting portion 15 is formed on the front face of the digital camera enclosure 1. The digital camera enclosure 1 formed by extrusion molding is placed on a machining center and the like with the front face up, and hole making is performed from the front face side. After that, by performing deburring, screw cutting (screw holes 15b) and the like, the lens barrel mounting portion 15 is formed.

Lastly, by mechanical machining, the board mounting portion 16 is formed on the rear face of the digital camera enclosure 1. The digital camera enclosure 1 formed by extrusion molding is placed on the machining center and the like with the rear face up, the hole making and screw cutting are performed from the rear face side. After that, deburring and the like is performed and the hole 16a and the screw hole 16b are formed.

[Mounting of Components on Each Accommodation Portion of the Digital Camera Enclosure 1]

Using FIG. 2, mounting of components onto the optical system accommodation portion 11, the electronic component accommodation portion 12, and the recess portion 14 for strap mounting member will be described.

(Mounting of the Lens Barrel 5 on the Optical System Accommodation Portion 11)

The lens barrel 5 with a mounting member 52 mounted on the outer edge is made to penetrate through the hole 15*a* of the lens barrel mounting portion 15. And a screw 53 is inserted through the hole of the mounting member 52 and screwed and fitted in the screw hole 15*b* so that the image pickup element 51 and a flexible board (not shown) disposed on its rear face and the wall on the rear face side of the optical system accommodation portion 11 are in contact with each other through a heat transfer member 21. As a result, the lens barrel 5 is mounted on the digital camera enclosure 1.

The heat generated at the image pickup element 51 is directly transferred to the digital camera enclosure 1 through the heat transfer member 21. The heat transferred to the digital camera enclosure 1 is transferred through inside the digital camera enclosure 1 and radiated to the outside of the digital camera enclosure 1 (See the arrow in FIG. 2). Since the insulating layer 13 is provided adjacently to the optical system accommodation portion 11, the heat transferred to the digital camera enclosure 1 is shielded by the insulating layer 13 and is not directly transferred to the board 6 disposed in contact with the inside of the electronic component accommodation portion 12. As a result, influence of the heat generated at the image pickup element 51 on the electronic component mounted on the board 6 can be reduced.

(Mounting of the Board 6 on the Electronic Component Accommodation Portion 12)

A projection portion (not shown) is provided at a part of both the right and left ends of the board 6, and the board 6 and the electronic component accommodation portion 12 are formed in a dimensional relation so that the projection portion of the board 6 and the projection portion 12*a* of the electronic component accommodation portion 12 are in contact with each other. In a state where the board 6 is positioned in the horizontal direction by inserting the board 6 into the electronic component accommodation portion 12 so that the projection portion 12*a* of the electronic component accommodation portion 12 and the board 6 are in contact with each other, a screw 62 is inserted through the hole of the board 6 and the hole 16*a* of the board mounting portion 16 so as to be screwed and fitted in the screw hole 16*b*, the board 6 is mounted inside the electronic component accommodation portion 12.

An elastic body is disposed on the rear face of the board 6, and the board 6 is threadably mounted so that the ground pattern provided on the front face side of the board 6 and the electronic component accommodation portion 12 are brought into contact with each other with a contact pressure of a predetermined pressure or more. As a result, the metal digital camera enclosure 1 can be used as a ground, which can improve strength against static electricity.

Also, the board 6 is threadably mounted so that a desired electronic component 61 mounted on the board 6 and the wall on the rear face side of the electronic component accommodation portion 12 are brought into contact through a heat transfer member 22. The heat generated at the electronic component 61 is transferred directly to the digital camera enclosure 1 through the heat transfer member 22. The heat transferred to the digital camera enclosure 1 is transferred through inside the digital camera enclosure 1 and radiated to the outside of the digital camera enclosure 1 (See the arrow in FIG. 2). Also, since the insulating layer 13 is provided adjacently to the electronic component accommodation portion 12, the heat transferred to the digital camera enclosure 1 is shielded by the insulating layer 13 and is not directly transferred to the image pickup element 51 disposed in contact with the optical system accommodation portion 11. As a result, the influence of the heat generated at the electronic component mounted on the board 6 on the image pickup element 51 can be reduced.

(Mounting of the Strap Mounting Member 4 on the Recess Portion 14 for Strap Mounting Member)

The substantially T-shaped portion 4*a* of the strap mounting member 4 is inserted into the recess portion 14 for strap mounting member. By sandwiching the strap mounting member 4 between the upper plate 2 and the lower plate 3, only the hole portion 4*b* into which the strap is to be inserted is exposed to the outside of the digital camera enclosure 1.

According to this embodiment, since the digital camera enclosure having a plurality of accommodation portions inside can be formed by single molding, manufacturing costs of parts and the number of assembling processes can be reduced. Also, since the digital camera enclosure is formed by a single part, a gap generated on a side face and the like due to assembling of parts is eliminated, and enclosure strength and designability can be improved.

In the present embodiment, by providing an air layer between the optical system accommodation portion 11 and the electronic component accommodation portion 12 by the insulating layer 13, flow of heat from the optical system accommodation portion 11 to the electronic component accommodation portion 12 and the flow of heat from the electronic component accommodation portion 12 to the optical system accommodation portion 11 are shielded, but by inserting an insulating sheet in the insulating layer 13, heat insulation effect of the insulating layer 13 can be further improved, and influence of heat can be further reduced.

Also, in the present invention, the heat transfer member is sandwiched only at one spot between the electronic component on the rear face side of the board 6 and the electronic component accommodation portion 12, but a plurality of heat transfer members may be used or the heat transfer member may be used on the whole faces on the both sides of the board as long as no nonconformity is caused in the electronic component and the like by application of a force on the board 6.

Also, in the present embodiment, the digital camera enclosure is made using a body portion formed by extrusion molding as it is, but in order to handle various designs or to improve radiation effect, secondary machining such as resin painting on the outer edge may be performed.

Figure 3:
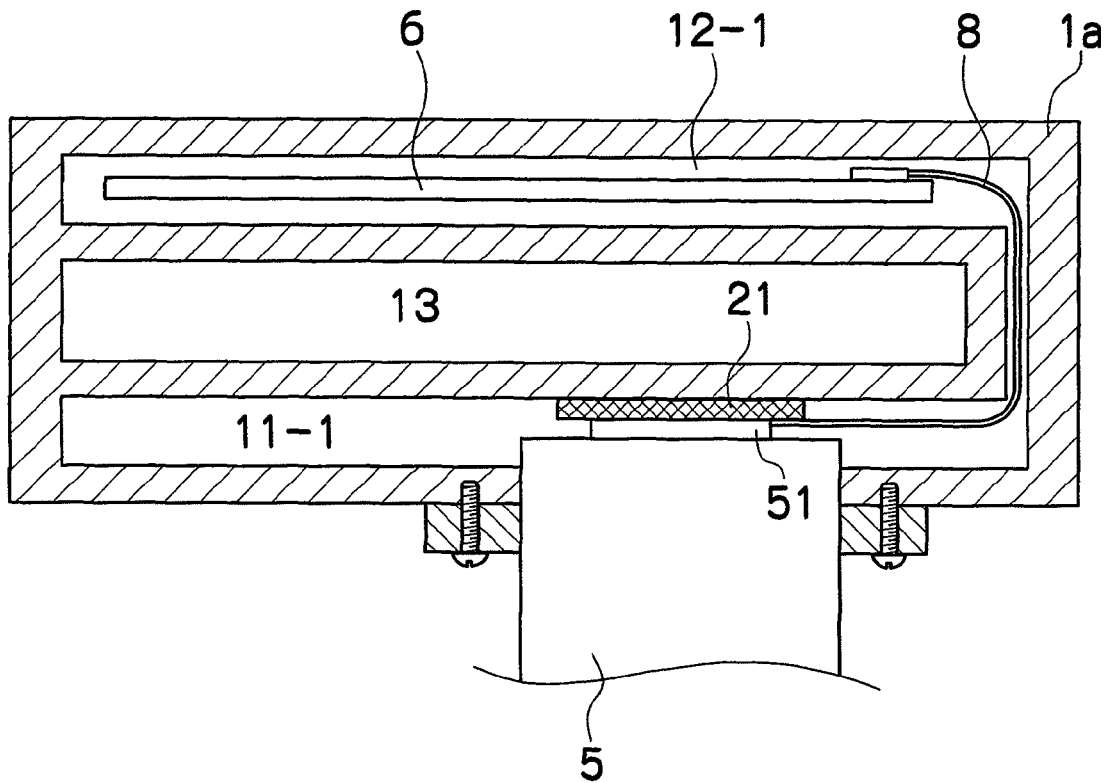
FIG. 3 is another example of the first embodiment.

Also, in the present embodiment, the digital camera enclosure with a sectional shape in which the optical system accommodation portion 11 and the electronic component accommodation portion 12 are separated is used, but as shown in FIG. 3, the optical system accommodation portion 11 and the electronic component accommodation portion 12 may be partially connected. By this arrangement, the image pickup element 51 and the board 6 can be connected by a flexible board 8 more easily, which facilitates assembling.

Figure 4:
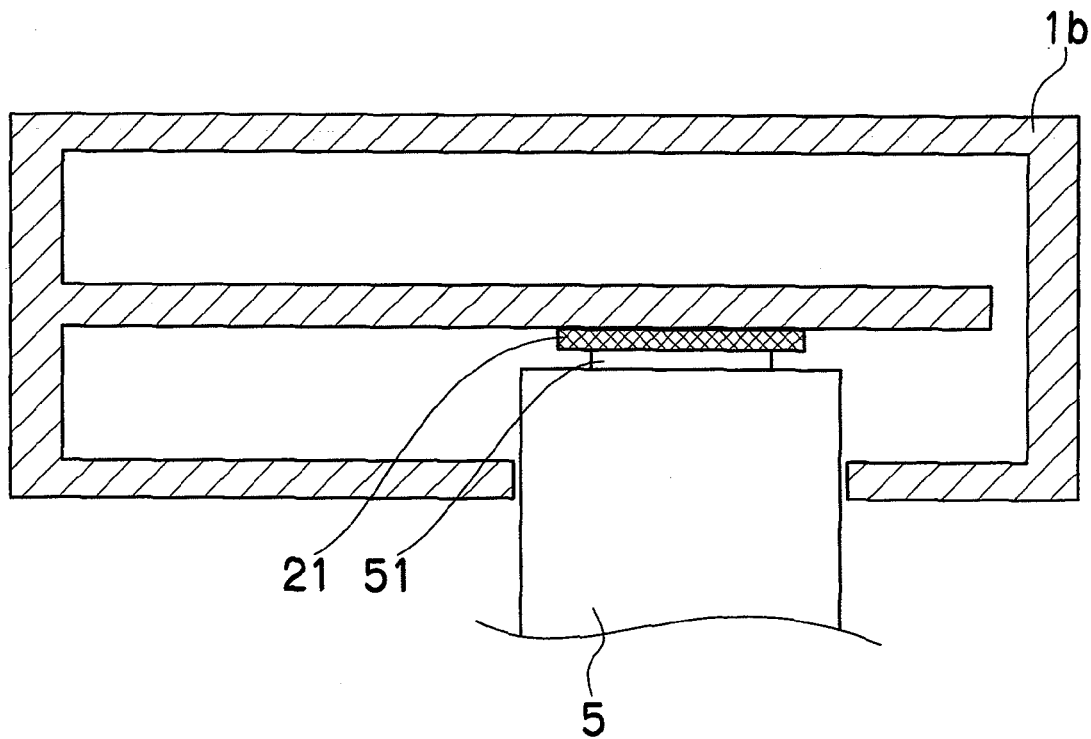
FIG. 4 is another example of the first embodiment.

Also, in the present embodiment, the optical system accommodation portion 11 and the electronic component accommodation portion 12 are separated from each other, and the insulating layer 13 is formed between the optical system accommodation portion 11 and the electronic component accommodation portion 12, but the insulating layer 13 does not have to be formed. Also, the optical system accommodation portion 11 and the electronic component accommodation portion 12 may be fully separated by a partition wall dividing the optical system accommodation portion 11 from the electronic component accommodation portion 12, or as shown in FIG. 4, one end of the partition wall may be connected to an outer wall of the digital camera enclosure. In this case, flexure of the partition wall on which the lens barrel 5 is mounted can make resistance against impact such as drop stronger.

Also, in the present embodiment, the digital camera enclosure is formed by vertical extrusion, but the extrusion direction is not limited to that. In the case of horizontal extrusion, the board 6 is positioned in the vertical direction with respect to the electronic component accommodation portion 12.

Second Embodiment

A second embodiment is different from the first embodiment in mounting of the lens barrel, in which a decoration ring is used.

FIG. 5 is a partial sectional view of a digital camera enclosure 1' of the second embodiment. The same reference numerals are given to the same portions as those in the first embodiment, and the description will be omitted.

[Structure of the Digital Camera Enclosure 1']

A lens barrel mounting portion 15' is formed by post machining on the wall on the front face side of the optical system accommodation portion 11 and constituted by a hole 15a' having a diameter larger than the maximum diameter of the lens barrel 5' and four screw holes 15b' formed by post machining on the wall on the rear face side of the optical system accommodation portion 11 and used when the lens barrel 5 is fixed to the digital camera enclosure 1'. It is only necessary that the number of the screw holes 15b' may be three or more and not limited to four.

[Mounting of Components on Each Accommodation Portion of the Digital Camera Enclosure 1']

(Mounting of the Lens Barrel 5' on the Optical System Accommodation Portion 11)

The lens barrel 5' on which the mounting member 53 is mounted on the outer edge is penetrated through the hole 15a' of the lens barrel mounting portion 15'. A screw 54 is inserted through the hole of the mounting member 53 and screwed and fitted in the screw hole 15b' so that the image pickup element 51 and the flexible board 8 disposed on its rear face and the wall on the rear face side of the optical system accommodation portion 11 are brought into contact with each other through the heat transfer member 21. As a result, the lens barrel 5' is mounted on the digital camera enclosure 1'. The heat generated at the image pickup element 51 is transferred to the digital camera enclosure 1' efficiently.

Next, a decoration ring 55 is attached to the digital camera enclosure 1'. The decoration ring 55 comprises an attachment portion 55a to be fitted in the hole 15a' and a decoration portion 55b covering the hole 15a' at attachment. At the center of the decoration ring 55, a hole into which the lens barrel 5' can be inserted is formed. The lens barrel 5' is fitted through the hole formed at the center of the decoration ring, the attachment portion 55a is fitted through the hole 15a', and the decoration ring 55 is attached to the digital camera enclosure 1' using snap fit and the like, not shown.

According to the present embodiment, since the screw used for mounting of the lens barrel is hidden by the decoration ring, the heat generated at the image pickup element is removed efficiently, while the designability can be improved.

Third Embodiment

A third embodiment is different from the first and second embodiments in mounting of the lens barrel, in which mounting accuracy and mounting strength of the lens barrel are improved as compared with those in the first embodiment.

Figure 6A:
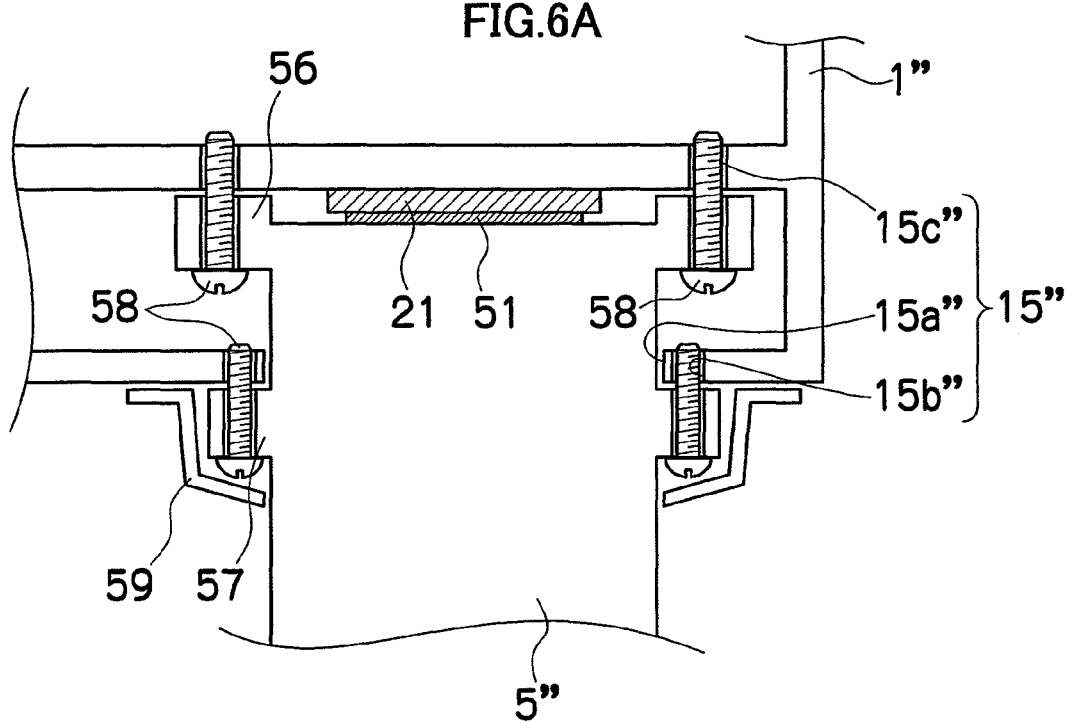
FIG. 6A is a sectional view of an essential part of a digital camera enclosure 1" of a third embodiment to which the present invention is applied.
Figure 6B:
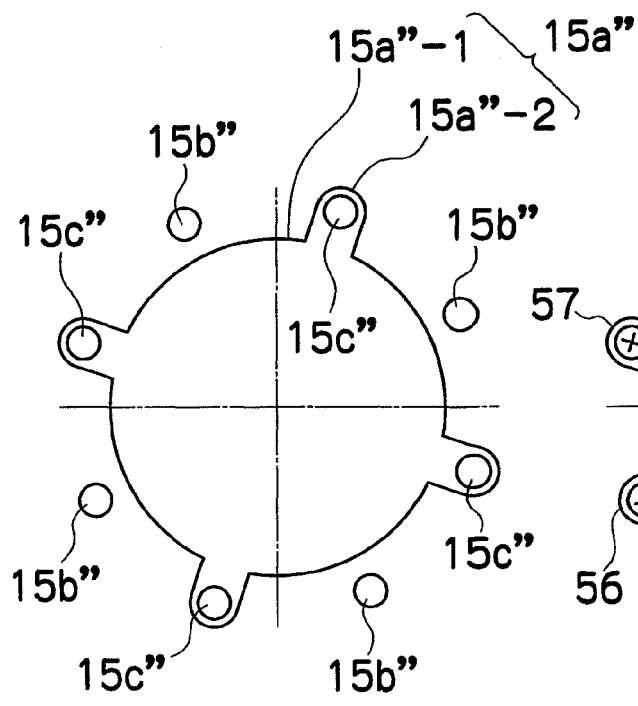
FIG. 6B is a front view of the essential part.
Figure 6C:
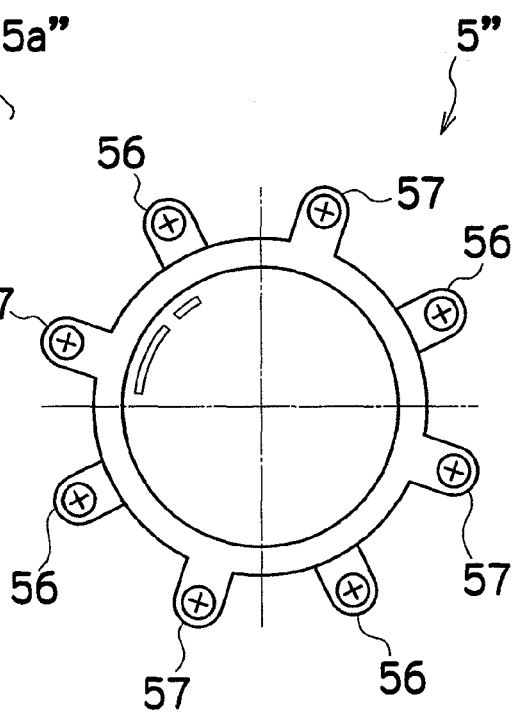
FIG. 6C is a front view of a lens barrel 5" of the third embodiment.

FIG. 6A is a partial sectional view of a digital camera enclosure 1" of the third embodiment, FIG. 6B is a front view of a lens barrel mounting portion 15", and FIG. 6C is a front view of a lens barrel 5". The same reference numerals are given to the same portions as those in the first embodiment, and the description will be omitted.

[Structure of the Digital Camera Enclosure 1"]

The lens barrel mounting portion 15" is formed by post machining and constituted by a hole 15a" into which a body portion of the lens barrel 5" can be fitted and screw holes 15b" and 15c" used when the lens barrel 5" is fixed on the digital camera enclosure 1".

The hole 15a" is formed on the wall on the front face side of the optical system accommodation portion 11, and is constituted by, as shown in FIG. 6B, a hole 15a"-1 having a diameter larger than the maximum diameter of the lens barrel 5" and four projection-shaped holes 15a"-2 integrally formed with the hole 15a"-1 and arranged uniformly on an outer circumference of the hole 15a"-1.

The holes 15b" are four screw holes formed by post machining on the wall on the front face side of the optical system accommodation portion 11 and formed at positions displaced by a predetermined angle with respect to the hole 15a"-2 when seen from the front face of the digital camera enclosure 1".

The holes 15c" are four screw holes formed by post machining on the wall on the rear face side of the optical system accommodation portion 11 and formed at the same positions as those of the holes 15a"-2 when seen from the front face of the digital camera enclosure 1".

It is only necessary that the number of the screw holes 15b" and 15c" is three or more and not limited to four.

[Mounting of Components on Each Accommodation Portion of the Digital Camera Enclosure 1"]

(Mounting of the Lens Barrel 5" on the Optical System Accommodation Portion 11)

First, when the lens barrel 5" is mounted on the digital camera enclosure 1", mounting rings 56 and 57 are disposed on the lens barrel 5" so that the mounting rings 56 are located on the front face of the wall on the rear face side of the optical system accommodation portion 11 and the mounting rings 57 are located on the front face of the wall on the front face side of the optical system accommodation portion 11.

Next, the mounting rings 56 are penetrated through the holes 15a"-2 and the lens barrel 5" is penetrated through the hole 15a"-1. A screw 58 is inserted through the hole of the mounting ring 56 and screwed and fitted in the screw holes 15b". The screw 58 is also inserted through the hole of the mounting ring 57 and screwed and fitted in the screw holes 15c".

Lastly, the decoration ring 59 is attached to the digital camera enclosure 1'. The lens barrel 5" is fitted through the hole formed at the center part of a decoration ring 59, and the decoration ring 59 is attached to the digital camera enclosure 1' using snap fit or the like, not shown.

According to the present embodiment, since the screw used for mounting of the lens barrel is hidden by the decoration ring, the heat generated at the image pickup element can be efficiently removed and designability can be improved. Also, since the mounting portions are provided at two locations in the axial direction of the lens barrel, the mounting accuracy of the lens barrel in the inclination direction can be improved. Also, by mounting at plural locations, the mounting strength of the lens barrel 5" can be improved, and resistance against impact such as drop can be enhanced.

Fourth Embodiment

A fourth embodiment is different from the first embodiment in the shape of the electronic component accommodation portion and has an object to further improve the heat removal effect.

Figure 7:
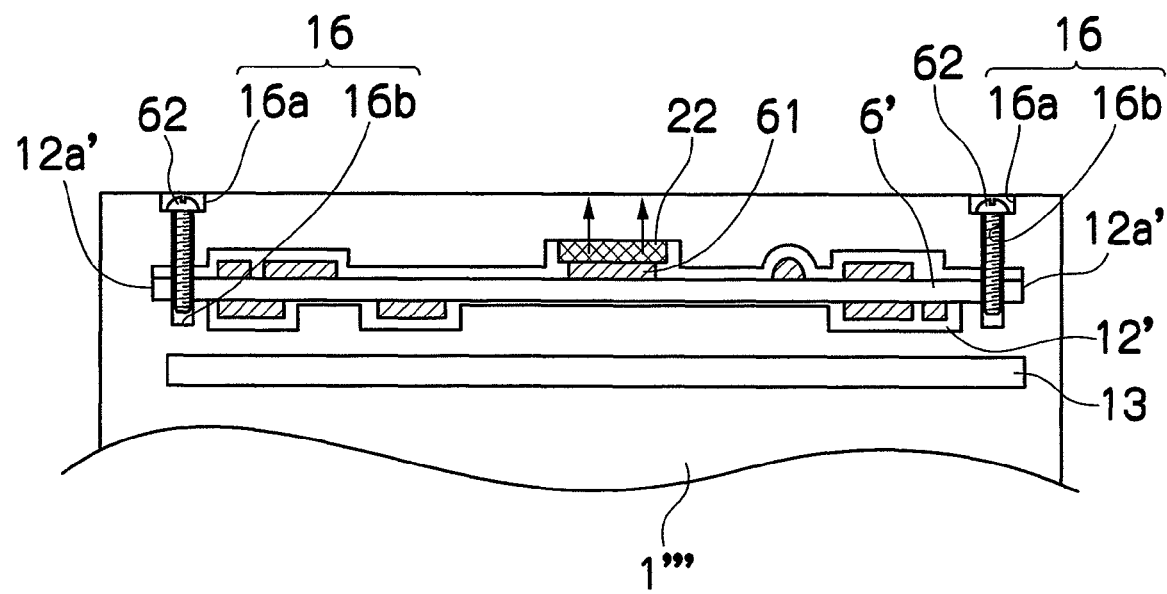
FIG. 7 is a sectional view of an essential part of a digital camera enclosure 1''' of a fourth embodiment to which the present invention is applied.
Figure 8:
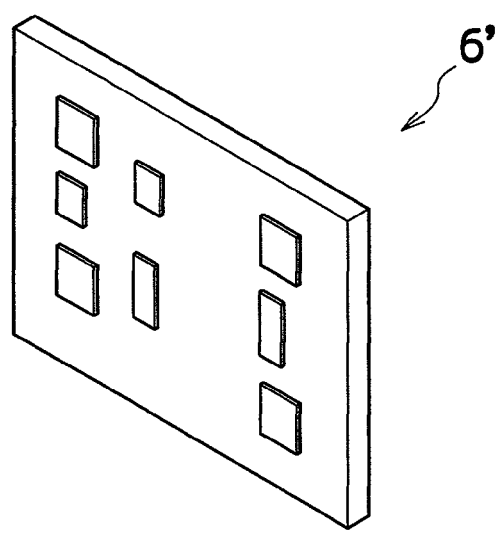
FIG. 8 is a perspective view of a board 6' of the fourth embodiment.

FIG. 7 is a partial sectional view of a digital camera enclosure 1''' of the fourth embodiment, and FIG. 8 is a perspective view of a board 6' accommodated inside an electronic component accommodation portion 12' of the fourth embodiment. The same reference numerals are given to the same portions as those in the first embodiment, and the description will be omitted.

[Structure of the Digital Camera Enclosure 1''']

The electronic component accommodation portion 12' is a through hole provided on the rear face side of the digital camera enclosure 1''' and having projection portions in the right and left directions and is formed at the same time when the outer shape of the digital camera enclosure 1''' is formed by extrusion molding. Inside the electronic component accommodation portion 12', the board 6' on which the electronic components are mounted in the straight state in the vertical direction as shown in FIG. 8 is accommodated through the board mounting portion 16 provided on the rear face side of the electronic component accommodation portion 12. Projection portions 12a' provided at right and left of the electronic component accommodation portion 12' are used as positioning portions in the right and left directions of the board 6'.

On the walls on the front face side and the rear face side of the electronic component accommodation portion 12', a thick part is made in compliance with the shape of the board 6' to be inserted inside, and a recess portion is partially formed in the shape of the electronic component accommodation portion 12'. As a result, a volume of the digital camera enclosure 1''' and heat capacity can be increased. Also, strength of the digital camera enclosure 1''' can be enhanced. Also, as compared with a case where the inside is not built up, the size of the digital camera enclosure 1''' can be reduced while the same heat capacity is maintained.

Projection portions (not shown) are provided at a part of both the right and left ends of the board 6', and the board 6' and the electronic component accommodation portion 12' are formed in such a dimensional relation that the projection portion of the board 6' and the projection portion 12a' of the electronic component accommodation portion 12' are brought into contact with each other.

(Mounting of the Board 6' on the Electronic Component Accommodation Portion 12')

The board 6' is inserted in the electronic component accommodation portion 12' so that the projection portion 12a' of the electronic component accommodation portion 12' and the board 6' are brought into contact with each other. While the board 6' is positioned in the right and left direction, the screw 62 is inserted into the hole of the board 6' and the hole 16a of the board mounting portion 16 and screwed and fitted in the screw hole 16b, and thereby the board 6' is mounted inside the electronic component accommodation portion 12'.

An elastic body is disposed on the rear face of the board 6', and the board 6' is threadably mounted so that the ground pattern provided on the front face side of the board 6' and the electronic component accommodation portion 12' are brought into contact with each other with a contact pressure of a predetermined pressure or more. As a result, the metal digital camera enclosure 1''' can be used as a ground, which can improve strength against static electricity.

Also, the board 6' is threadably mounted so that the desired electronic component 61 mounted on the board 6' and the wall on the rear face side of the electronic component accommodation portion 12' are brought into contact with each other through the heat transfer member 22. The heat generated at the electronic component 61 is transferred directly to the digital camera enclosure 1''' through the heat transfer member 22.

In the present embodiment, since the ground pattern of the board 6' and the electronic component accommodation portion 12' are brought into contact in a large area, the ground can be taken stably. Also, by bringing the board 6' and the electronic component accommodation portion 12' into contact in a large area, the heat can be removed more efficiently.

In the present embodiment, the ground pattern of the board 6' is provided only on the front face side, but since the larger the contact area between the ground pattern of the board 6' and the electronic component accommodation portion 12', the better it is, it may be so configured that the ground pattern is provided also on the rear face side of the board 6' so as to be brought into contact with the electronic component accommodation portion 12' if there is no problem in assembling performance and the like.

Also, in the present embodiment, a sectional area of the digital camera enclosure 1''' and the heat capacity can be increased by building up so as to eliminate an unnecessary cavity portion.

The present invention can be applied not only to the digital camera enclosure but also to various electronic components including cellular phone, PDA, music player and the like. Also, in the present invention, extrusion molding is carried out using an aluminum alloy, but not limited to aluminum, various materials capable of extrusion molding can be used. For example, a metal material such as a magnesium alloy may be used or a plastic material may be used.

Also, in the present invention, the case where the shape of the enclosure is substantially rectangular is used as an example for explanation, but not limited to the substantial rectangle, various shapes can be used.

What is claimed is:

1. An enclosure for electronic equipment, comprising:
    an enclosure body which is made of a metal and formed in a cylindrical shape; and
    a partition wall which partitions inside of the enclosure body, wherein
    the enclosure body and the partition wall are formed by extrusion molding, and
    two or more accommodation portions accommodating contents of electronic equipment are formed inside the enclosure body by the partition wall, and wherein
    after the extrusion molding of the enclosure, an insertion hole for an image pickup lens unit is formed by secondary mechanical machining on an exterior portion of the enclosure body and a mounting hole for the image pickup lens unit is formed on at least one of the exterior portion and the partition wall of the enclosure body.

2. The enclosure for electronic equipment according to claim 1, wherein
    between the two accommodation portions partitioned by the partition wall, a space as an insulating layer is formed by the partition wall.

3. The enclosure for electronic equipment according to claim 2, wherein
    an insulating sheet is inserted in the space.

4. An enclosure for electronic equipment, comprising:

an enclosure body which is made of a metal and formed in a cylindrical shape; and a partition wall which partitions inside of the enclosure body, wherein the enclosure body and the partition wall are formed by extrusion molding, and two or more accommodation portions accommodating contents of electronic equipment are formed inside the enclosure body by the partition wall, and wherein between the two accommodation portions partitioned by the partition wall, a space as an insulating layer is formed by the partition wall, wherein an insulating sheet is inserted in the space, and, wherein after the extrusion molding of the enclosure, an insertion hole for an image pickup lens unit is formed by secondary mechanical machining on an exterior portion of the enclosure body and a mounting hole for the image pickup lens unit is formed on at least one of the exterior portion and the partition wall of the enclosure body.

5. An imaging device, comprising:

an enclosure for electronic equipment according to claim 4; and an image pickup lens unit including an image pickup element, wherein the image pickup element is brought into contact with the partition wall directly or through a heat transfer member when the lens unit is positioned and fixed on the enclosure.

6. The imaging device according to claim 5, further comprising an accommodation portion substantially in the L-shape in which a battery provided with a shape for preventing inverse insertion is accommodated.

7. An imaging device comprising an enclosure for electronic equipment according to claim 4, wherein an image pickup lens unit is disposed at one of the two accommodation portions partitioned by the partition wall of the enclosure, while a board is disposed at the other accommodation portion.

8. The imaging device according to claim 7, wherein the board is guided by right and left or upper and lower grooves formed inside the other accommodation portion, accommodated in the other accommodation portion and fixed by a fixing device provided at the enclosure.

9. The imaging device according to claim 8, wherein an electronic component is mounted on the board; and the electronic component is brought into contact with at least one of the exterior portion and the partition wall directly or through the heat transfer member at fixation by the fixing device.

10. The imaging device according to claim 9, wherein a pattern for reference potential is formed on the board; and the pattern for reference potential is brought into contact with at least one of the exterior portion and the partition wall at the fixation by the fixing device.

11. The imaging device according to claim 10, further comprising an accommodation portion substantially in the L-shape in which a battery provided with a shape for preventing inverse insertion is accommodated.

12. An enclosure for electronic equipment, comprising:

an enclosure body which is made of a metal and formed in a cylindrical shape; and a partition wall which partitions inside of the enclosure body, wherein the enclosure body and the partition wall are formed by extrusion molding, and two or more accommodation portions accommodating contents of electronic equipment are formed inside the enclosure body by the partition wall, and wherein an image pickup lens unit is disposed at one of the two accommodation portions partitioned by the partition wall of the enclosure, while a board is disposed at the other accommodation portion.

13. The imaging device according to claim 12, wherein the board is guided by right and left or upper and lower grooves formed inside the other accommodation portion, accommodated in the other accommodation portion and fixed by a fixing device provided at the enclosure.

14. The imaging device according to claim 12, wherein an electronic component is mounted on the board; and the electronic component is brought into contact with at least one of the exterior portion and the partition wall directly or through the heat transfer member at fixation by the fixing device.

15. The imaging device according to claim 12, wherein a pattern for reference potential is formed on the board; and the pattern for reference potential is brought into contact with at least one of the exterior portion and the partition wall at the fixation by the fixing device.

16. The imaging device according to claim 12, further comprising an accommodation portion substantially in the L-shape in which a battery provided with a shape for preventing inverse insertion is accommodated.

* * * * *